July 2, 1957       W. P. RIZOR       2,797,423
CLOGGED SEWER AND DRAIN CLEANER
Filed Sept. 15, 1954
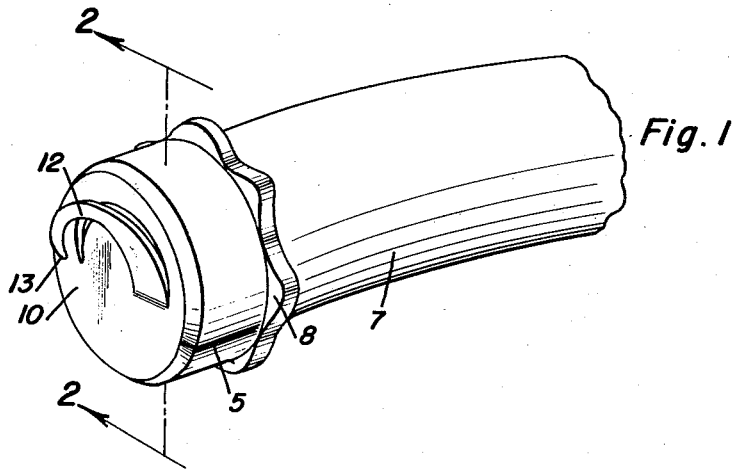
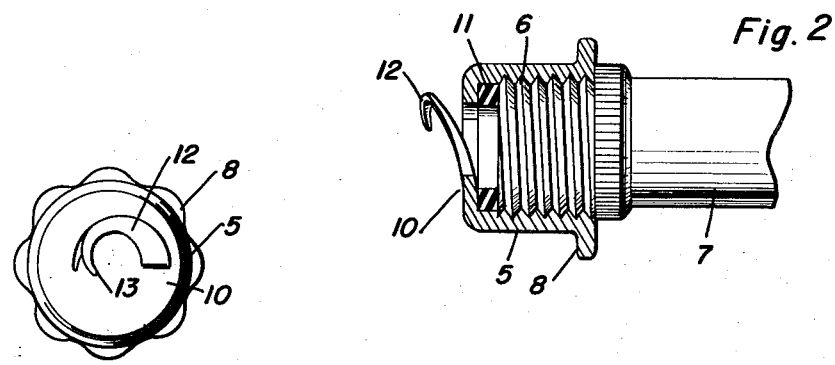
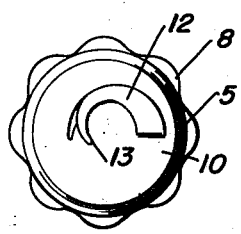
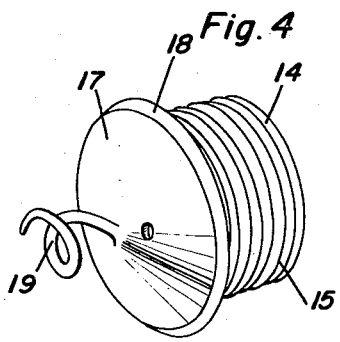
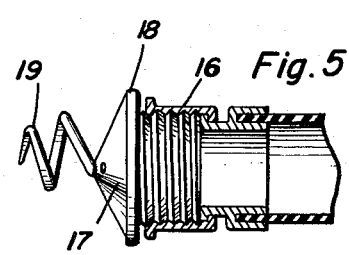
William P. Rizor
INVENTOR.
BY *Clarence A. O'Brien*
*and Harvey B. Jacobson*
Attorneys

United States Patent Office 2,797,423
Patented July 2, 1957

2,797,423

CLOGGED SEWER AND DRAIN CLEANER

William P. Rizor, Long Beach, Calif.

Application September 15, 1954, Serial No. 456,102

1 Claim. (Cl. 15—104.3)

The present invention relates to new and useful improvements in devices for freeing or opening clogged sewer or drain lines and adapted for attaching to a garden hose for feeding the device into the clogged line.

An important object of the invention is to provide a cutting or reaming attachment for the end of a garden hose and which may be rotated by turning the hose as the latter is feed into a clogged sewer or drain pipe.

Another object of the invention is to provide an attachment of this character adapted for connecting to the usual hose coupling means of a garden hose and which may be easily and quickly attached to and removed from the hose and without destroying the usefulness of the hose for its intended purpose.

A still further object is to provide a device of this character of simple and practical construction, which is efficient and reliable in operation, relatively inexpensive to manufacture, and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view;

Figure 2 is a longitudinal sectional view taken on a line 2—2 of Figure 1;

Figure 3 is a front elevational view;

Figure 4 is a perspective view of a modified construction; and

Figure 5 is a side elevational view thereof with connected hose and coupler portions shown in section.

Referring now to the drawing in detail, and first with respect to the form of the invention illustrated in Figures 1 to 3, inclusive, the numeral 5 designates an internally threaded cap adapted for threading onto an externally threaded hose coupling member 6 of a conventional type and which is secured to one end of a garden hose 7.

The rear or inner end of the cap 5 is formed with an undulated flange 8 to provide finger gripping means for tightly connecting the same to the hose coupling.

The outer end of the cap is closed, as indicated at 10, and a washer 11 may be placed inside the cap between the closed end 10 thereof and the end of the coupling 6.

A spiral cutter 12 is stamped or pressed from the material of the closed end 10 of the cap to project forwardly thereof, and with the base of the cutter united with the cap and with the free end of the cutter tapered, as shown, at 13.

In the modified construction illustrated in Figures 4 and 5, the cap 14 is externally threaded, as shown at 15, to enter the female member 16 of a conventional type of hose coupling, and the outer end of the cap is closed, as shown at 17, and formed with a flange 18 to turn the cap in the outer end of the coupling 16.

The closed end portion 17 of the cap is preferably conical in shape and with a corkscrew type cutter 19 welded, soldered or otherwise suitably secured to the apex of the conical closed end 17 of the cap and in a position so that the cutter projects forwardly therefrom.

In the operation of the device, the cap is attached to the end of the garden hose which is then fed into a clogged sewer or drain pipe, and the hose is turned in a manner to rotate the cap so that the spiral cutter will bore its way into the clogged line to clear the latter of its obstructions.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A clogged pipe line cleaner comprising: a cap for mounting on an end of a garden hose, said cap including a substantially flat front end, and a substantially spiral blade partially struck out from said front end of said cap providing therein an arcuate opening behind said blade for discharging water thereon.

References Cited in the file of this patent

UNITED STATES PATENTS

| | | |
|---|---|---|
| 805,534 | Flitcroft | Nov. 28, 1905 |
| 1,044,920 | Schilow | Nov. 19, 1912 |
| 1,549,537 | Hansen | Aug. 11, 1925 |
| 1,963,561 | Sanger | June 19, 1934 |
| 2,024,339 | Connell | Dec. 17, 1935 |
| 2,158,577 | Haley | May 16, 1939 |
| 2,568,347 | Lundelius | Sept. 18, 1951 |